US011488002B2

(12) United States Patent
Jaffari et al.

(10) Patent No.: US 11,488,002 B2
(45) Date of Patent: Nov. 1, 2022

(54) BINARY NEURAL NETWORK ACCELERATOR ENGINE METHODS AND SYSTEMS

(71) Applicant: Atlazo, Inc., La Jolla, CA (US)

(72) Inventors: Javid Jaffari, San Diego, CA (US); Karim Arabi, San Diego, CA (US); Rodolfo Beraha, San Diego, CA (US)

(73) Assignee: ATLAZO, INC., La Jolla, CA (US)

( * ) Notice: Subject to any disclaimer, the term of this patent is extended or adjusted under 35 U.S.C. 154(b) by 931 days.

(21) Appl. No.: 16/277,768

(22) Filed: Feb. 15, 2019

(65) Prior Publication Data
US 2019/0251425 A1 Aug. 15, 2019

Related U.S. Application Data

(60) Provisional application No. 62/631,044, filed on Feb. 15, 2018.

(51) Int. Cl.
| G06N 3/063 | (2006.01) |
| G06F 17/16 | (2006.01) |
| G06F 7/575 | (2006.01) |
| G06N 3/04 | (2006.01) |
| G06F 9/30 | (2018.01) |

(52) U.S. Cl.
CPC ............. *G06N 3/063* (2013.01); *G06F 17/16* (2013.01); *G06N 3/0454* (2013.01); *G06F 7/575* (2013.01); *G06F 9/3001* (2013.01)

(58) Field of Classification Search
None
See application file for complete search history.

(56) References Cited

U.S. PATENT DOCUMENTS

| 6,010,063 | A | * | 1/2000 | Suzuki | ...................... G06F 7/53 |
| | | | | | 235/62 F |
| 7,937,559 | B1 | | 5/2011 | Parameswar et al. | |
| 10,748,524 | B2 | * | 8/2020 | Wang | ...................... G10L 15/02 |
| 2003/0009502 | A1 | | 1/2003 | Katayanagi | |
| 2003/0014457 | A1 | | 1/2003 | Desai et al. | |

(Continued)

FOREIGN PATENT DOCUMENTS

WO 9811483 A1 3/1998

OTHER PUBLICATIONS

Y.-H. Chen, J. Emer, V. Sze, "Eyeriss: A Spatial Architecture for Energy-Efficient Dataflow for Convolutional Neural Networks," International Symposium on Computer Architecture (ISCA), pp. 367-379, Jun. 2016.

(Continued)

*Primary Examiner* — Joni Hsu
(74) *Attorney, Agent, or Firm* — Perkins Coie LLP

(57) ABSTRACT

Disclosed are methods, apparatus and systems for a binary neural network accelerator engine. One example circuit is designed to perform a multiply-and-accumulate (MAC) operation using logic circuits that include a first set of exclusive nor (XNOR) gates to generate a product vector based on a bit-wise XNOR operation two vectors. The result is folded and operated on by another set of logic circuits that (Continued)

provide an output for a series of adder circuits. The MAC circuit can be implemented as part of binary neural network at a small footprint to effect power and cost savings.

20 Claims, 13 Drawing Sheets

(56) References Cited

U.S. PATENT DOCUMENTS

| | | | |
|---|---|---|---|
| 2005/0127939 A1* | 6/2005 | Allen | H03K 19/00369 326/30 |
| 2012/0216011 A1 | 8/2012 | Gove et al. | |
| 2012/0278376 A1* | 11/2012 | Bakos | G06F 17/16 708/607 |
| 2014/0115301 A1 | 4/2014 | Sanghai et al. | |
| 2014/0195775 A1 | 7/2014 | Ould-Ahmed-Vall et al. | |
| 2016/0291974 A1 | 10/2016 | Lingam et al. | |
| 2016/0292127 A1 | 10/2016 | Lingam et al. | |
| 2017/0177357 A1 | 6/2017 | Ould-Ahmed-Vall et al. | |
| 2018/0239589 A1* | 8/2018 | Kroener | G06F 7/74 |
| 2018/0307950 A1* | 10/2018 | Nealis | G06F 9/3001 |
| 2019/0081637 A1* | 3/2019 | Pool | G06N 7/005 |
| 2019/0147338 A1* | 5/2019 | Pau | G06N 5/003 706/20 |
| 2019/0235867 A1 | 8/2019 | Jaffari et al. | |
| 2019/0385023 A1* | 12/2019 | Li | G06K 9/6262 |

OTHER PUBLICATIONS

Chao Wang, Lei Gong, Qi Yu, Xi Li, Yuan Xie, Xuehai Zhou, "DLAU: A Scalable Deep Learning Accelerator Unit on FPGA", IEEE Transactions on Computer-Aided Design of Integrated Circuits and Systems (vol. 36 , Issue: 3 , Mar. 2017).

Matthieu Courbariaux, Itay Hubara, Daniel Soudry, Ran El-Yaniv, Yoshua Bengio, "Binarized Neural Networks: Training Deep Neural Networks with Weights and Activations Constrained to +1 or −1". arxiv.org, Mar. 17, 2016, pp. 1-11.

Mohammad Rastegari, Vicente Ordonez, Joseph Redmon, Ali Farhadi, "XNOR-Net: ImageNet Classification Using Binary Convolutional Neural Networks", European Conference on Computer Vision ECCV 2016: Computer Vision—ECCV 2016 pp. 525-542, Aug. 2016.

Jaffari, Javid et al. U.S. Appl. No. 16/242,839 Non-Final Office Action dated Jul. 29, 2019.

International Application No. PCT/US2019/012724 International Search Report and Written Opinion dated Apr. 26, 2019, pp. 1-11.

Jaffari, Javid et al. U.S. Appl. No. 16/242,839 Final Office Action dated Jan. 7, 2020.

Jaffari, Javid et al. U.S. Appl. No. 16/242,839 Notice of Allowance dated Mar. 9, 2020.

* cited by examiner

Input: 32x32x3
Output: 10 class

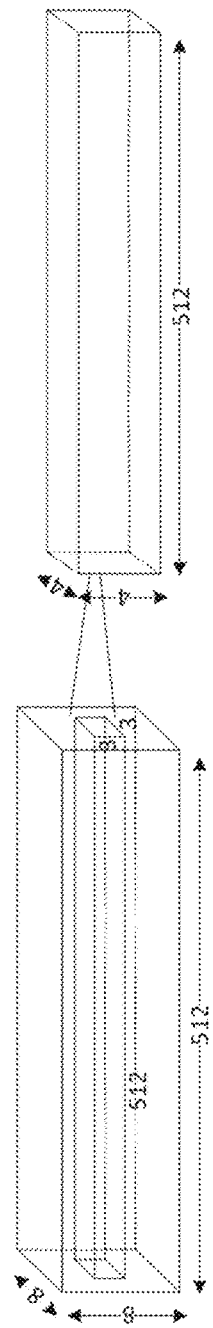
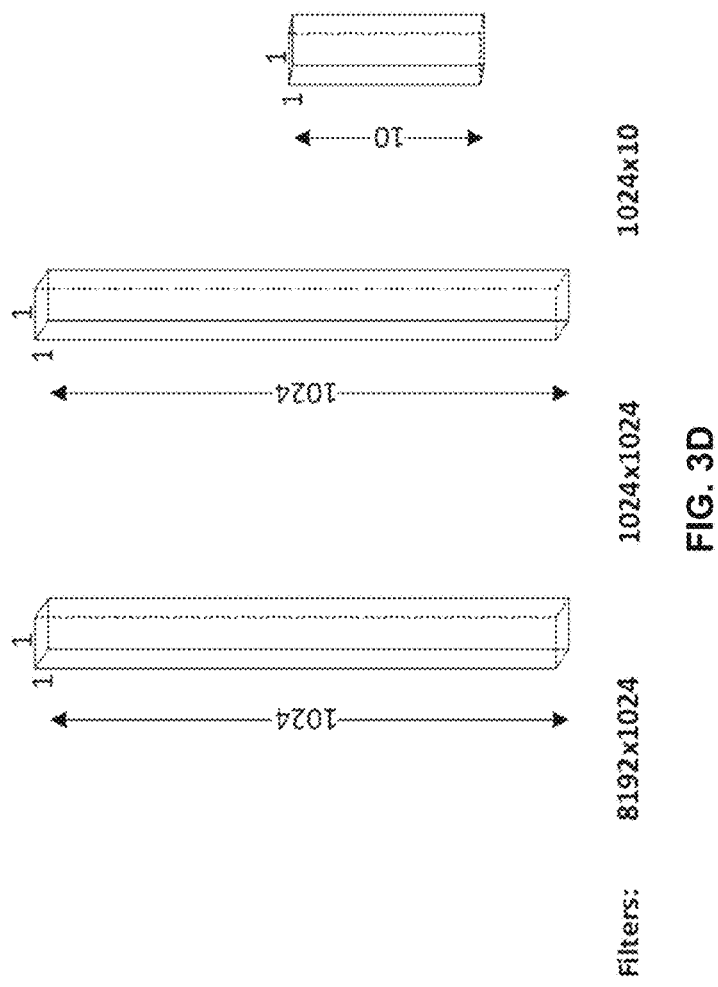
FIG. 3C
FIG. 3D

| Layer | Weights (KB) | MACs (M) |
|---|---|---|
| Conv1 | 13.5 | 3.37 |
| Conv2 | 576 | 144 |
| Conv3 | 1,152 | 72 |
| Conv4 | 2,304 | 144 |
| Conv5 | 4,608 | 72 |
| Conv6 | 9,216 | 144 |
| FC1 | 32,768 | 8 |
| FC2 | 4,096 | 1 |
| FC3 | 40 | 0.01 |

FIG. 4

TCM:
- $TCM_f$ = $f$ filters weights of each $m \times n \times 128$
- $TCM_i$ = Input activation of size $mm \times nn \times 128$
- $TCM_o$ = Partial sums of the $mm \times nn \times f'$
- $TCM_o$ = New activation output $mm \times nn \times f'$ $TCM_f$
- 4 KB: 256 × 128
- $f \times m \times n \times 128$: 256 × 1 × 1 × 128, 28 × 3 × 3 × 128, 16 × 4 × 4 × 128, 10 × 5 × 5 × 128, ..., 1 × 16 × 16 × 128

$TCM_i$
- 4 KB: 256 × 128
- e.g.: 16 × 16 × 128

$TCM_o$
- 4 KB: 2048 × 16 (16b partial sums)
- e.g.: 8 × 16 × 16

$TCM_o$
- 256 B: 64 × 32

FIG. 9

```
LD.F    f  ff kk                          // Load filter weights from system mem to TCM_f
LD.I    M N K mm nn kk                    // Load activations from system mem to TCM_i
LD.PI   M N K mm nn kk ff                 // Load partial sums from system mem to TCM_p
ST.PO   M N K mm nn kk ff                 // Store partial sums from TCM_p to system mem
ST.O    M N K mm nn kk ff                 // Store activations from TCM_o to system mem
CONV    m n mm nn kk ff                   // apply convolution filtering
ACTV    mm nn kk ff                       // apply activation function
```

FIG. 10

BINARY NEURAL NETWORK ACCELERATOR ENGINE METHODS AND SYSTEMS

CROSS-REFERENCE TO RELATED APPLICATIONS

This patent document claims priority to and benefits of U.S. Provisional Patent Application No. 62/631,044 entitled "SYSTEMS, DEVICES AND METHODS FOR BINARY NEURAL NETWORK ACCELERATOR ENGINE" and filed on Feb. 15, 2018. The entire content of the before-mentioned patent application is incorporated by reference as part of the disclosure of this patent document.

TECHNICAL FIELD

This document generally relates to neural networks, and more particularly to implementations of binary neural networks.

BACKGROUND

Neural networks are currently the foundation for many modern artificial intelligence (AI) applications. The superior performance of neural networks comes from their ability to extract high-level features from raw sensory data after using statistical learning over a large amount of data to obtain an effective representation of an input space. Implementations of neural networks find applications in a myriad of applications from self-driving cars, to detecting cancer, and to playing complex games.

The complexity of neural networks, from both a memory and power consumption standpoint, can be reduced by using reduced precision activations and weights in the neural network. Binary neural networks (BNNs) replace some of the floating or fixed-point arithmetic in traditional convolutional neural networks with significantly more efficient bitwise operations, and with a minimal loss of accuracy.

Computational savings effected by the BNNs make them suitable for implementation in Internet of Things (IoT) applications. IoT is a network of physical devices that can include appliances, vehicles and other devices that have embedded electronics, software, and network connectivity to enable these physical devices to connect and exchange data. Each physical device of the IoT can be uniquely identifiable through its embedded computing system and is able to communicate with other devices using the existing infrastructure of the Internet. While not limited to IOT, the small form factor, ultra-low power consumption, and low cost requirements make power consumption and physical footprint of the associated circuitry critically important in IoT applications since they directly impact the battery lifetime, cost and efficiency of such systems.

SUMMARY OF SOME EMBODIMENTS

Disclosed are devices, systems and methods for a binary neural network accelerator engine for reducing the electronic footprint and computations, and thus the energy consumption of neural network operations in various applications.

One aspect of the disclosed technology relates a logic circuit for computing a dot product, which is a prevalent operation in neural networks. This logic circuit includes a first set of exclusive nor (XNOR) gates, where each XNOR gate is configured to receive one bit of a first vector of length N bits and one bit of a second vector of length N bits, and to generate a product vector of length N bits at the output of the first set of XNOR gates. The logic circuit also includes a first buffer and a second buffer each having a length N/2 bits to store the product vector in two portions. Each of the first and the second buffers is coupled to inputs of a second set of XNOR gates and to inputs of a first set of NOR gates. The logic circuit further includes a third buffer and a fourth buffer each having a length N/2 bits, where the third buffer is configured to store output results of the first set of NOR gates, and the fourth buffer is configured to store output results of the second set of XNOR gates. The logic circuit additionally includes a plurality of adders having inputs that are coupled to the third and the fourth buffers and configured to add binary values stored in the third and the fourth buffers to generate the dot product of the first and second bit vectors. The length of the length of the dot product is, for example, equal to $\log_2(N)$.

Another aspect of the disclosed technology relates to an apparatus that includes a memory and a processor that implements the method disclosed in this patent document.

BRIEF DESCRIPTION OF THE DRAWINGS

FIG. 3C illustrates a third portion of an exemplary neural network that is configured to process the CIFAR-10 dataset.

FIG. 3D illustrates a fourth portion of an exemplary neural network that is configured to process the CIFAR-10 dataset.

FIG. 4 is a table listing of exemplary memory and computational requirements of different operations of a real-valued CNN.

FIG. 9 is an exemplary partitioning of tightly coupled memory (TCM) used in an implementation of a BNN.

FIG. 10 illustrates an exemplary instruction set architecture (ISA) for BNNs.

DETAILED DESCRIPTION

A convolutional neural network (CNN) is a class of deep neural networks, most commonly applied to analyzing visual imagery, and which require relatively minimal preprocessing compared to other image classification algorithms. A typical CNN consists of an input and an output layer, as well as multiple hidden layers. The hidden layers of a CNN typically consist of convolutional layers, RELU layers e.g. activation functions, pooling layers, fully connected layers and normalization layers.

However, CNN-based recognition systems need large amounts of memory and computational power. While they perform well on expensive, GPU-based machines, they are often unsuitable for smaller devices like cell phones and embedded electronics, the latter of which are staples in IoT applications. The complexity of CNNs, from both a memory and power consumption standpoint, can be reduced by using lower precision activations and weights in the various layers on the CNN. Binary neural networks (BNNs) provide an optimal implementation in that some of the floating or fixed-point arithmetic in traditional CNNs are replaced with significantly more efficient bitwise operations, and with a minimal loss of accuracy.

Figure 1:
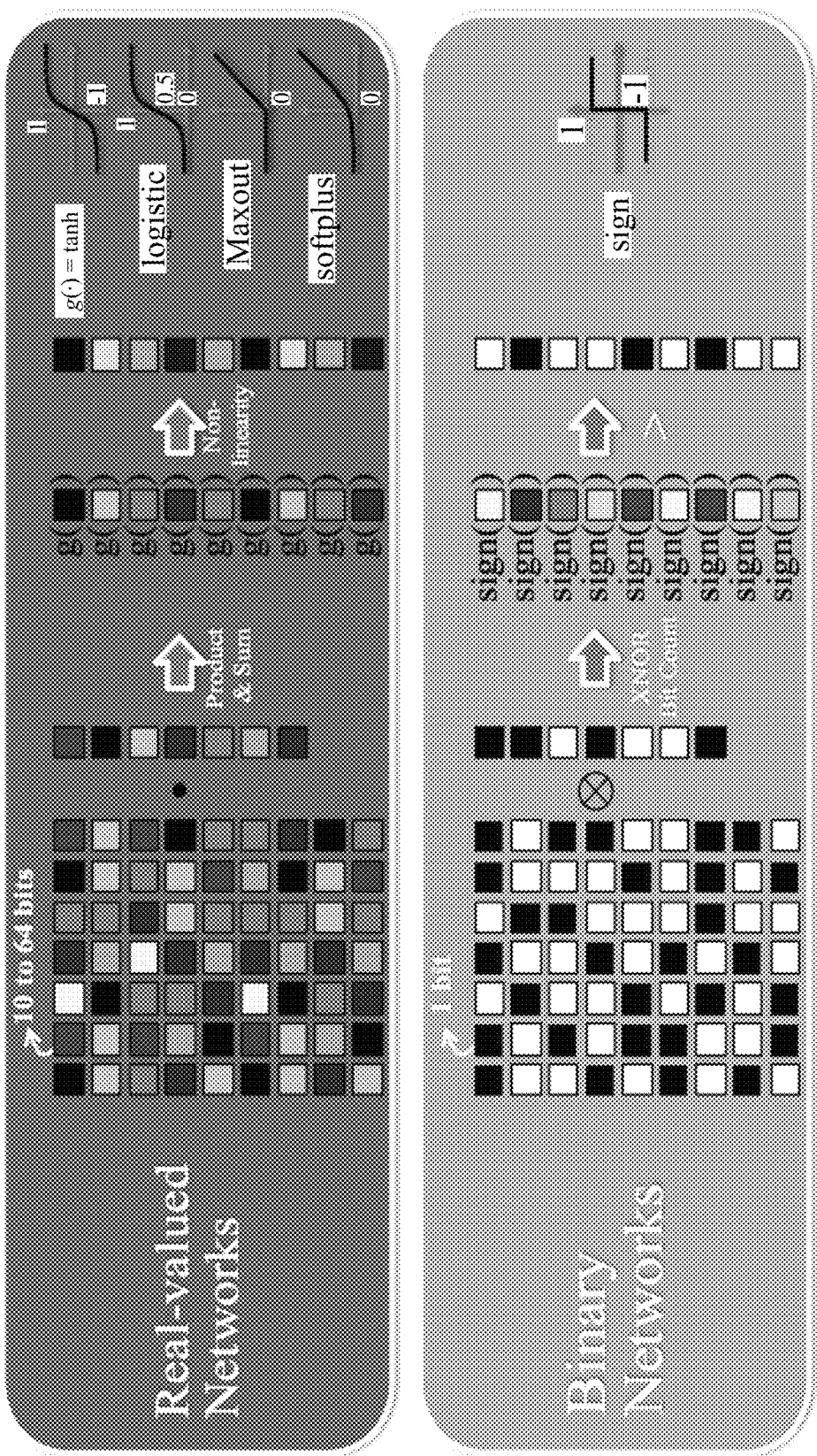
FIG. 1 is a high-level comparison between real-valued and binary networks.

A high-level comparison between real-valued networks and binary networks is illustrated in FIG. 1. As illustrated therein, the input image for a real-valued network typically consists of pixels that may have bit-widths that range from 10-64 bits, and performing the convolution operation requires a product-and-sum operation (also referred to as a multiply-and-accumulate or MAC operation). The result of the MAC operation is then processed by a non-linear function (e.g., hyperbolic tangent, logistic, soft-plus as illustrated in FIG. 1) to derive an output. In contrast, the input image for a binary network consists of bits, and the MAC operation is replaced with Exclusive NOR (or XNOR) and bit-count operations. Finally, the output is generated by computing the sign of the binary MAC operation, which is significantly less computationally expensive than the non-linear functions used in real-valued neural networks. Thus, BNNs provide significant complexity reductions, and have been shown to provide this with minimal loss of accuracy.

Figure 2:
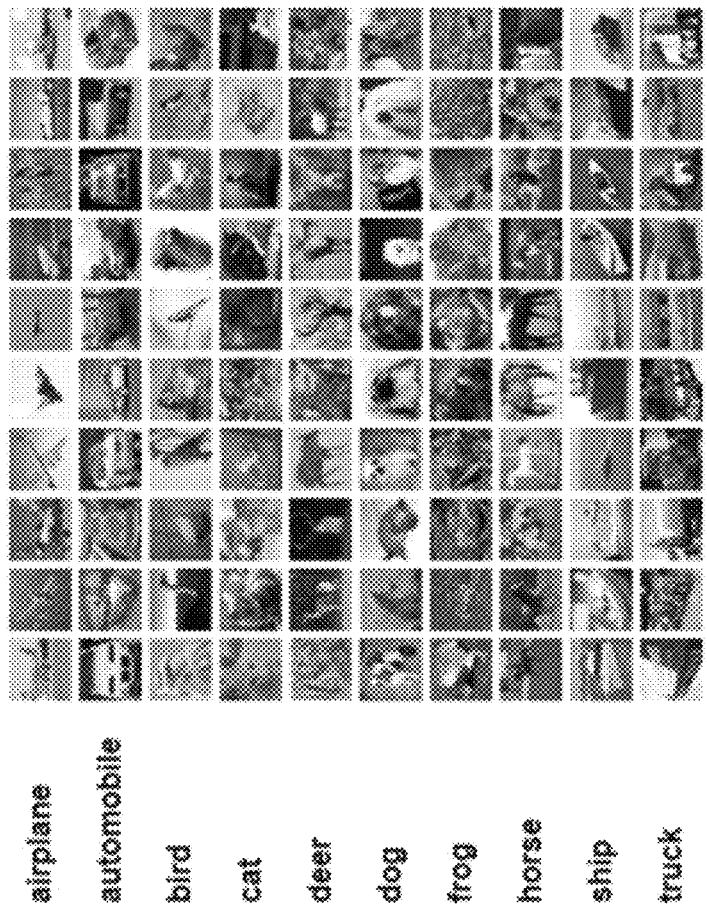
FIG. 2 is an example of images in the CIFAR-10 dataset.

FIG. 2 is an example of images in the CIFAR-10 (Canadian Institute For Advanced Research) dataset. The CIFAR-10 dataset is a collection of images that are commonly used to train machine learning and computer vision algorithms. It is one of the most widely used datasets for machine learning research. The CIFAR-10 dataset contains 60,000 32×32 color images in 10 different classes. The 10 different classes represent airplanes, cars, birds, cats, deer, dogs, frogs, horses, ships, and trucks, and there are 6,000 images of each class. Ten representative images in each class are illustrated in FIG. 2. To facilitate the understanding of the disclosed embodiment, in this patent document, the CIFAR-10 data is sometimes used as an example to demonstrate the efficacy of BNNs, as compared to CNNs, with regard to complexity reduction.

Figure 3A:
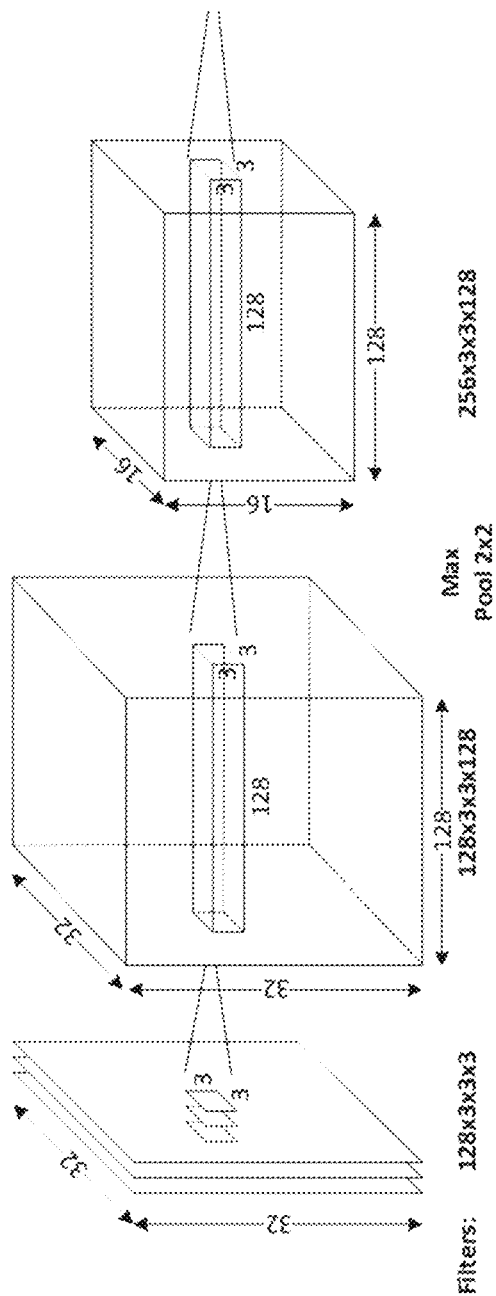
FIG. 3A illustrates a first portion of an exemplary neural network that is configured to process the CIFAR-10 dataset.

FIGS. 3A-3D illustrate consecutive portions of an exemplary simplified neural network that is configured to process the CIFAR-10 dataset. In keeping with the typical framework described above, the exemplary neural network illustrated in FIGS. 3A-3D includes convolutional layers and pooling layers (e.g., FIGS. 3A, 3B and 3C), as well as fully connected layers (e.g., FIG. 3D). As illustrated in FIG. 3A, the input is the CIFAR-10 data wherein each image is 32×32 pixels with 3 color components (e.g., red, green and blue, referred to as RGB), which can be represented by the notation 32×32×3.

The convolutional layer of a CNN applies a convolution operation to the input, passing the result to the next layer. The convolution operation includes moving a kernel (e.g., an K×K grid) over the image (e.g. of size N×N) and performing a dot-product and sum operation at each location of the kernel on the image. In a convolutional layer, N>K and typically, N>>K. The convolution emulates the response of an individual neuron to visual stimuli.

Figure 3B:
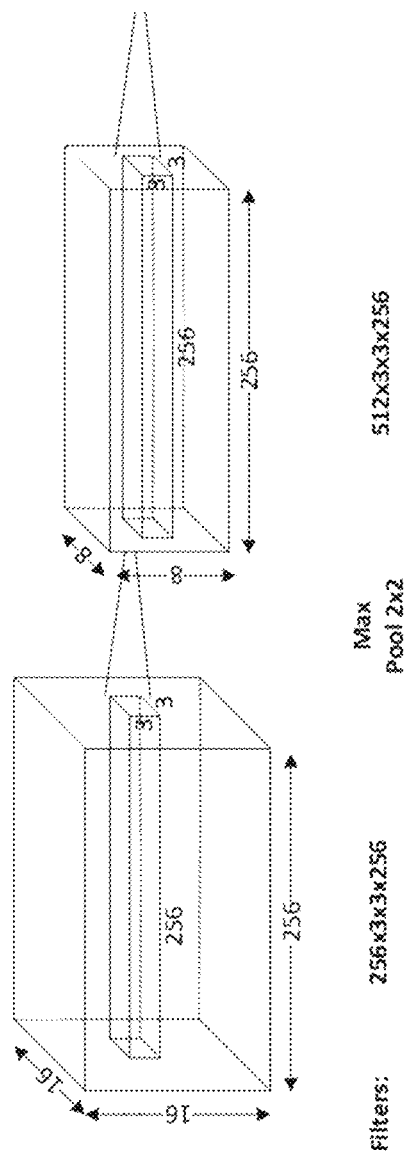
FIG. 3B illustrates a second portion of an exemplary neural network that is configured to process the CIFAR-10 dataset.

FIG. 3A illustrates the initial convolutional and pooling layers; each convolutional layer uses 128 filters (the depth of the layer) and the pooling layer is a 2×2 maxPool (i.e., max pooling) operation. The 2×2 maxPool operation is a downsampling operation that selects the highest value amongst four adjacent values (2×2), which results in the input image being reduced from 32×32 to 16×16. FIGS. 3B and 3C illustrate the subsequent convolutional and pooling layers, wherein the filter size (depth) increases and the 2×2 maxPool operation continues to reduce the input image size to the next convolutional layer. Finally, FIG. 3D illustrates the fully connected layers, which result in the output, which is the 10×1 vector that represents recognition probabilities for each of the 10 classes of the CIFAR-10 dataset given the original input image.

In some embodiments, a binary neural network implemented using the structure illustrated in FIGS. 3A-3D binarizes the weights and inputs at each convolutional layer during the forward propagation step. The binarization of a value may be performed by taking the sign of the value, which is an extremely efficient operation since the sign of a value stored in the two's complement notation is simply is most significant bit (MSB) of that value. While binarization of the weights and inputs does degrade the accuracy of the results to some degree, it has been shown that CNNs are generally well-suited to handling "noisy" signals, and are capable of producing results with sufficient accuracy for many applications.

FIG. 4 tabulates an example of the memory and computational requirements of the real-valued CNN, illustrated in FIGS. 3A-3D, used to process images from the CIFAR-10 dataset. Specifically, FIG. 4 tabulates the memory requirement for the weights (in kilobytes) and the number of MAC operations (in millions of operations) for each of the six convolutional and three fully connected layers of the CNN, assuming nominal 32-bit values for the pixels, weights and computations. The 32-bit implementation of the CNN requires 53.5 MB of memory to store the weights while using 588.4 MMAC (millions of MAC) operations. In contrast, a binary neural network using on the structure illustrated in FIGS. 3A-3D, requires 1.67 MB of memory to store the weights while using 4.6 MMAC operations, assuming a 128-bit wide binary MAC. This order of magnitude reduction in memory and computation advantageously enables BNNs to be used in devices that are power-constrained and require a small footprint, which is typical of IoT devices.

Figure 5A:
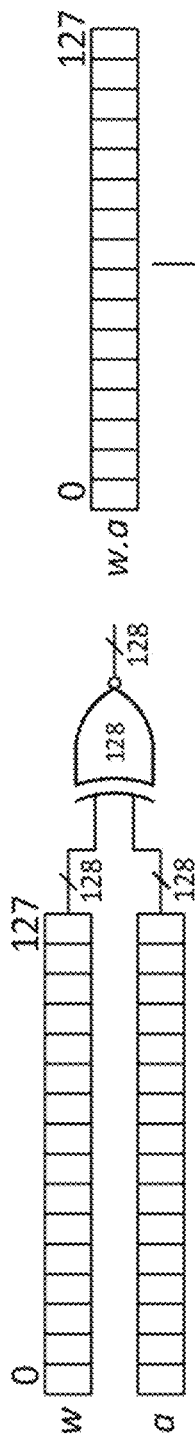
FIG. 5A illustrates a first set of computing elements of an exemplary binary neural network (BNN) accelerator engine.
Figure 5B:
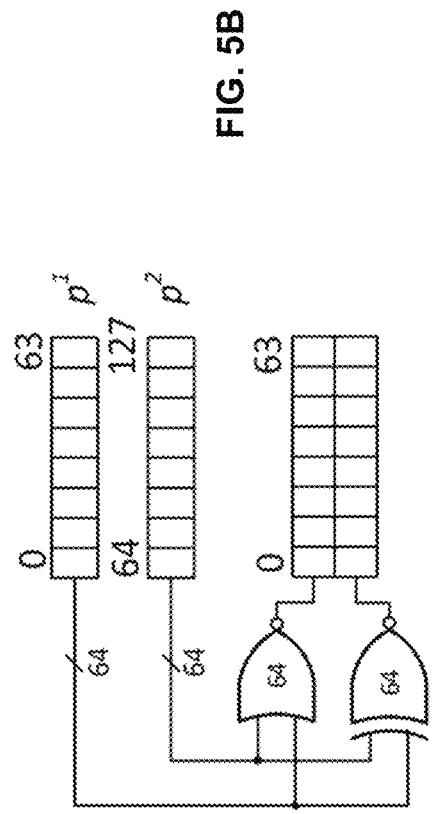
FIG. 5B illustrates a second set of computing elements of an exemplary binary neural network (BNN) accelerator engine.
Figure 5C:
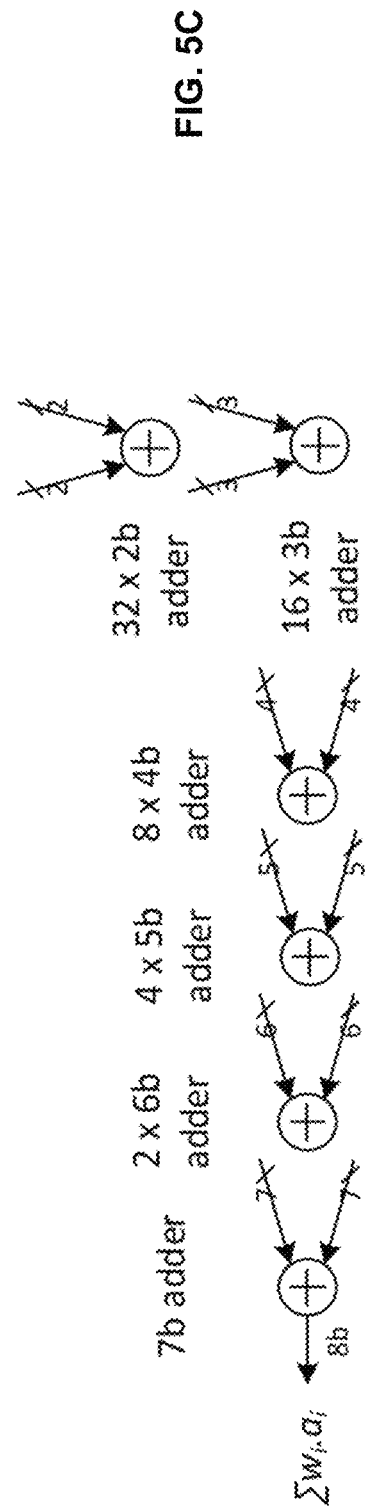
FIG. 5C illustrates a third set of computing elements of an exemplary binary neural network (BNN) accelerator engine.

FIGS. 5A, 5B and 5C illustrate computing elements of an exemplary binary neural network (BNN) accelerator engine that operates on 128-bit vectors in accordance with some embodiments. In particular, the depicted elements in FIGS. 5A to 5C are configured to perform a MAC operation on two binary vectors. In the example illustrated, the computing elements are SIMD (single instruction, multiple data) microoperations of a 128-bit wide binary (+1/−1) MAC. FIG. 5A illustrates the XNOR operation that has a first 128-bit input vector (a) and a second 128-bit input vector (w), and computes the bit-wise XNOR operation to produce a 128-bit product vector (w·a). It should be noted that in implementation, the logic circuit of FIG. 5A can include 128 2-bit XNOR gates that operate in parallel. In FIG. 5B, the product vector is first stored in a first set of two 64-bit buffers (denoted as $p^1$ and $p^2$ and sometimes referred to as the first and second buffers, respectively) in a sequential manner. As illustrated therein, bits 0-63 and bits 64-127 are stored in the first and second buffers, $p^1$ and $p^2$, respectively, of the first set of two buffers, respectively. Then, the 128 bits in the first set of two buffers are inputs to two bit-wise logic operations: a bit-wise NOR operation and a bit-wise XNOR operation, and the results are stored in a second set of two 64-bit buffers (e.g., a third and a fourth buffer). In some implementations, the NOR and XNOR gates in FIG. 5B can include 64 2-bit NOR and 64 2-bit XNOR gates that operate in parallel.

The second set of buffers may be interpreted as a single buffer of length 64 that stores 2-bit values. As illustrated in FIG. 5B, the result $p^1+p^2$, which can take on values from the set {00, 01, 11}, are stored in the second (set of) buffer(s). These 64 2-bit values are added using an adder tree as illustrated in FIG. 5C. As illustrated therein, 32 2-bit adders are used in parallel to compute 32 partial sums of the 64 2-bit input values, i.e., each pair of 2-bit inputs is operated on by one of the 32 2-bit adders. The 32 3-bit partial sums are then added together, in parallel, using 16 3-bit adders. As illustrated in FIG. 5C, this parallel adder tree continues until an 8-bit result corresponding to the sum of the dot product of the two input vectors is obtained.

In one example implementing the logic circuits of FIGS. 5A, 5B and 5C, the total computing elements include 120 full adders (FA), 127 half adders (HA) and 128 XNOR gates. The critical path (i.e., that path with the largest latency or computational load) in this MAC circuit consists of 13 full adders.

In some embodiments, the first and second set of buffers may not necessarily be implemented using different memory locations. Since all the operations in FIGS. 5A-5C are bit-wise operations, one of the input buffers may be re-used as an output buffer in order to reduce the memory footprint of the BNN accelerator engine.

For example, in some embodiments, the XNOR gate used in FIG. 5A may be the same XNOR gate used in FIG. 5B. Similarly, the adders in FIG. 5C may be re-used for the various steps of the computation since an N-bit adder can be used to implement an M-bit addition (with M<N) by zero-padding the input. Thus, embodiments of the disclosed technology provide an efficient implementation of computing the sum of a dot product of two binary input vectors, which is the most ubiquitous operation in convolutional layers.

Figure 6:
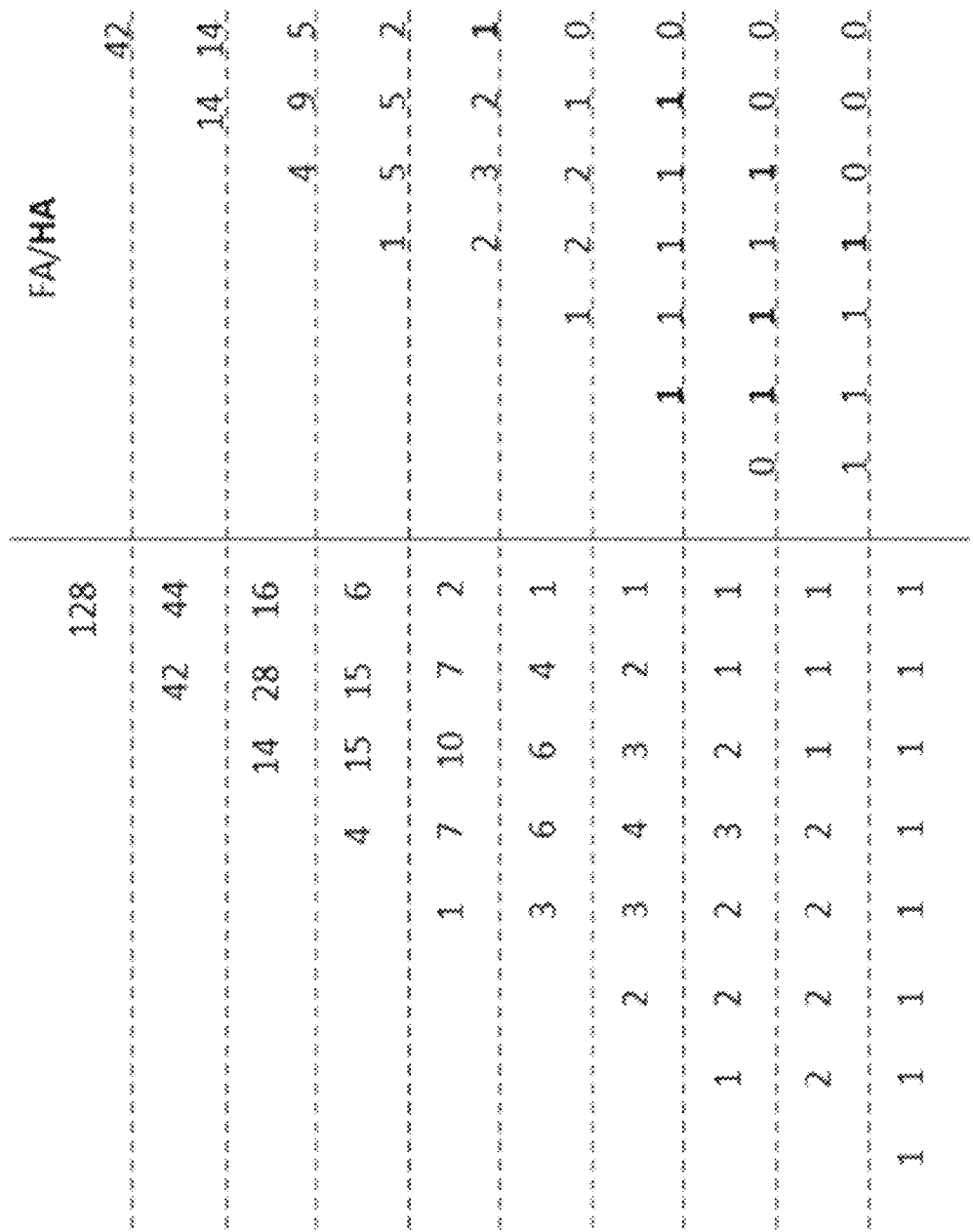
FIG. 6 illustrates an exemplary architecture for computing elements using population counting with a 3/2 reduction tree.

FIG. 6 illustrates an alternate architecture for computing elements using population counting (also referred to as pop-counting), as opposed to an XNOR implementation, with a 3/2 reduction tree. The total number of computing elements include 121 FA, 7 HA and 128 XNOR, and the critical path in this circuit consists of 9 full adders.

Figure 7:
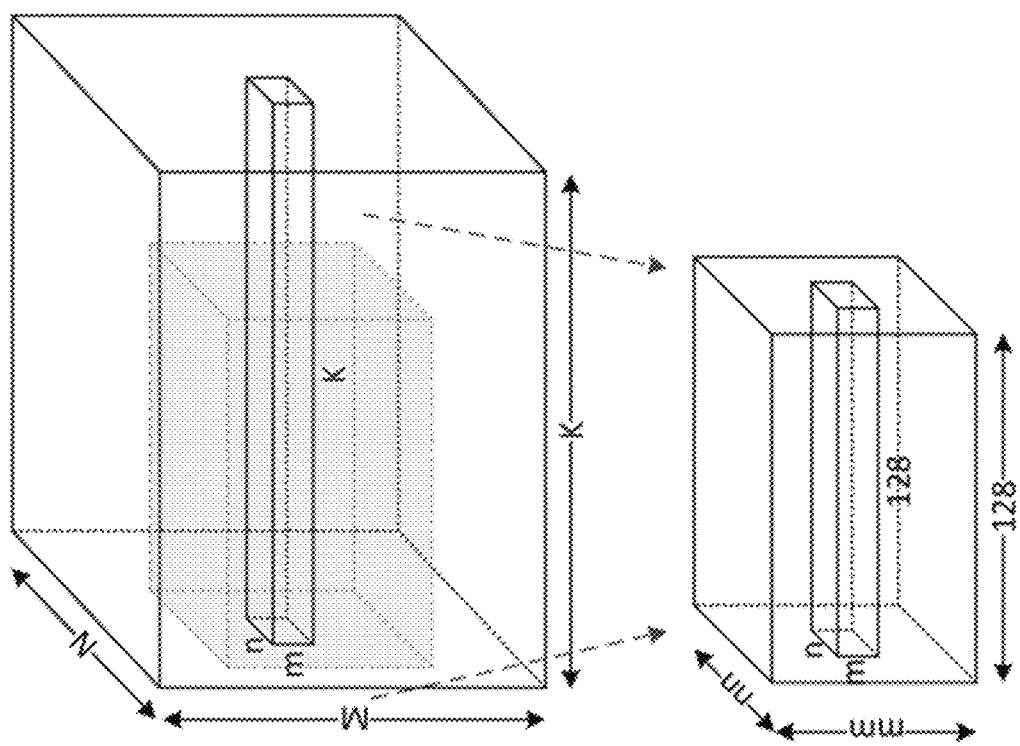
FIG. 7 illustrates an exemplary convolutional layer of a BNN.
Figure 8:
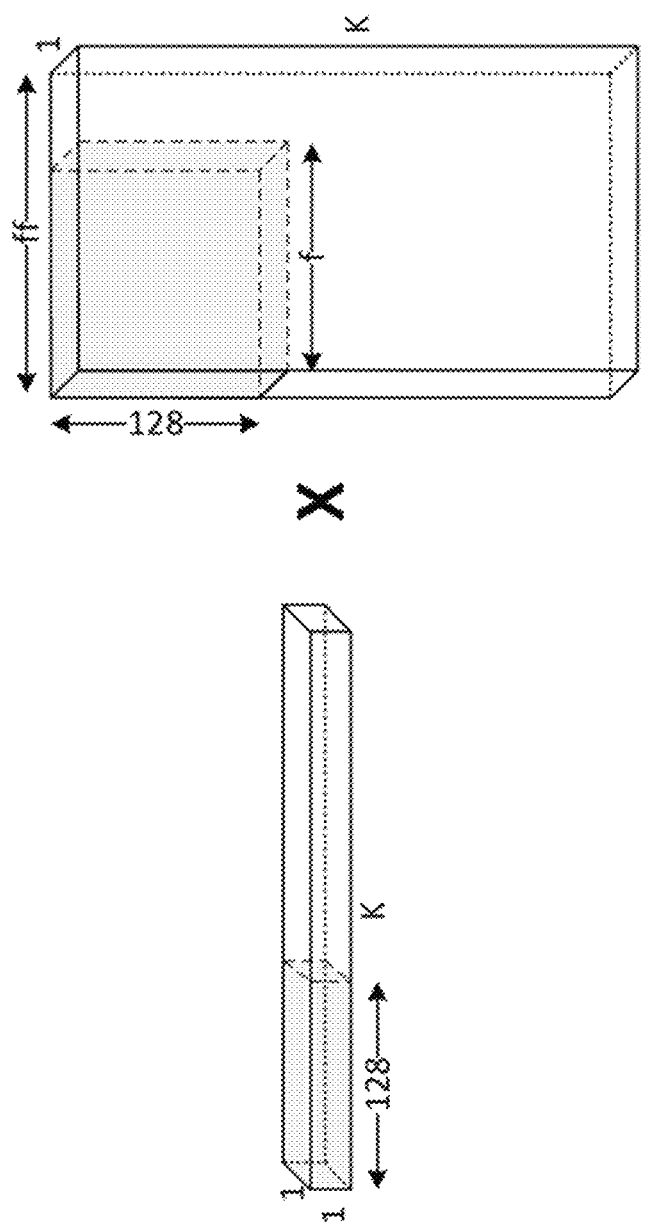
FIG. 8 illustrates an exemplary fully connected layer on a BNN.

FIGS. 7 and 8 show exemplary convolutional and fully connected layers of a BNN, respectively. As illustrated in FIG. 7, the convolutional layer processing includes the application off filters of size m×n×128 to mm×nn×128 input activation, followed by adding the result with partial sums of the same segment. In some embodiments, this may be implemented using the pseudocode shown in the table below.

TABLE 1

Pseudocode for a BNN convolutional layer

```
for p=1 to mm
  for q=1 to nn
    for o=ff to ff+f
      PS_{p,q,o} += Σ_{i=1}^{m} Σ_{j=1}^{n} bMAC(fo(i, j, kk . . kk+127), a(p+i, q+j, kk . . kk+127))
    end
  end
end
```

FIG. 8 illustrates the fully connected layer processing for a BNN, which is similar to that of the convolutional layer, but with mm=nn=1 and m=n=1. In some embodiments, this may be implemented using the pseudocode shown in the table below.

TABLE 2

Pseudocode for a BNN fully connected layer

```
for o=ff to ff+f
  PS_o += bMAC(f_o(kk . . kk+127), a(kk . . kk+127))
end
```

Efficient implementations of a BNN, as described in this patent document, include the use of tightly coupled memory (TCM), which provides guaranteed low-latency memory access with no real-time caching overhead. TCM is extremely configurable, and in an example, enables the size of each TCM to be independently selected from a minimum of 4 KB to a maximum of 256 KB. FIG. 9 is an exemplary partitioning of TCM used in an implementation of a BNN. As illustrated therein, TCM may be defined for the filter weights, input activations, partial sums from the filter (convolution) operations and for the new activation outputs. The partitioning in FIG. 9 is only an example, and can be configured to meet varying throughput and computing element footprint requirements.

FIG. 10 illustrates an example of an exemplary instruction set architecture (ISA) for BNNs, including instructions to move data between TCM units and system memory (e.g., load (LD) and store (ST) functions), as well as convolutional filtering (e.g., CONV) and activation (e.g., ACTV) functions.

Figure 11:
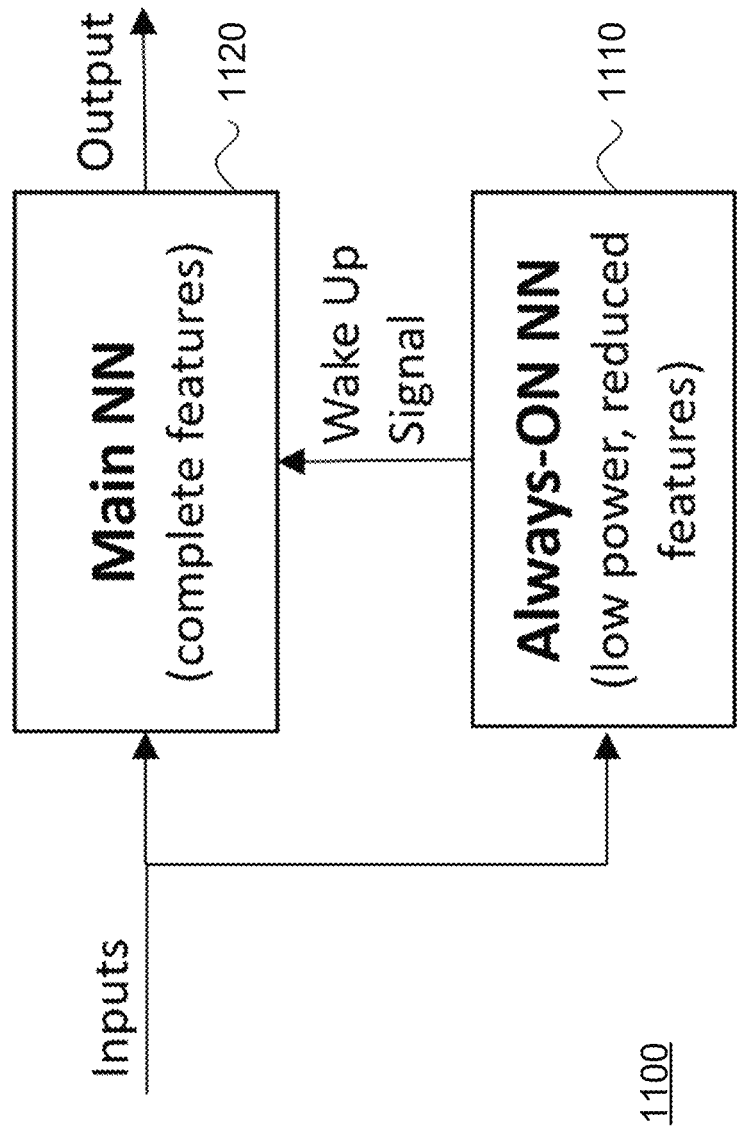
FIG. 11 illustrates an example of a wake-up neural network architecture.

Embodiments of the disclosed technology provide power efficient neural network implementations that may be used as "wake-up" neural networks to reduce power consumption while maintaining the advantage of using a real-valued neural network implementation with higher complexity. FIG. 11 illustrates an example of a wakeup neural network architecture 1100, wherein the always-on neural network 1110 is a low-power, reduced feature set neural network that is constantly receiving inputs and determining whether a feature is present. In one example scenario, when a feature has been recognized, the always-on neural network 1110 sends a wake-up signal to the main neural network 1120, which has higher complexity and uses more power since it provides more robust classification on a richer feature set. Thus, the main neural network 1120 would only turn on to process the input after it receives a trigger signal from the always-on neural network 1110 that, for example, a preliminary recognition of the input has been conducted.

In a simple example, the wakeup neural network architecture 1100 may be used for forest fire detection if the inputs were constant temperature and air particulate matter readings from a particular area. A sudden spike in temperature with an increase in air particulate matter would be the feature of interest. The always-on neural network 1110 would be able to discern that a gradual increase in temperature over the day or exhaust from a fleet of trucks were not indicative of a forest fire. However, if both conditions were satisfied and detected by the always-on neural network 1110, a wake-up signal would be sent to the main neural network 1120, which would then attempt to determine the location and severity of the forest fire given the temperature and air particulate matter readings. In some embodiments, the triggering signal from the always-on network 1110 need not be indicative of a preliminary recognition of all the conditions, but can be limited to recognition or detection of one condition that is associated with an increased probability of that an event. For example, in the previous example, a spike in temperature alone may be sufficient to trigger the main neural network 1120 to wake up. The sensitivity of the wake-up signal generation can be adjusted to provide a desired tradeoff between power consumption and reducing the probability of false negatives in detection an event. The configuration of FIG. 11 can provide significant power saving in IoT applications (e.g., sensing of anomalous heart pulse rates via an IoT-enabled watch) where battery power is limited.

In some embodiments, the always-on neural network 1110 may be a binary neural network, as described in the present document. In some embodiments, both the main neural network 1120 and the always-on neural network 1110 may be binary neural networks, where the latter is implemented with reduced complexity. In other embodiments, the always-on neural network 1110 may be a real-valued CNN but with reduced precision (e.g., the main neural network 1120 would operate on 64-bit values, whereas the always-on neural network 1110 would operate on 10-bit values). The wakeup neural network architecture 1100 would advantageously enable robust and accurate classification with reduced power consumption.

In some embodiments, the always-on neural network 1110 may be trained to detect the same set of features as the main neural network 1120, but operates with a lower precision than that of the main neural network 1120. Although this may result in an increased false positive rate for the always-on neural network 1110, it enables the main neural network 1120 to remain powered down for much of the time, thereby achieving overall power savings (despite the need to awake in the case of a false positive).

In some embodiments, the always-on neural network 1110 is trained to identify a smaller set of features than the main neural network 1120 (both neural networks can be of the same type, e.g., real-valued CNN, BNN and operate with the same precision or accuracy, e.g., at a lower bit width). Since the always-on neural network 1110 is searching for fewer features, it uses less memory and computational resources, thereby achieving overall power savings.

Figure 12:
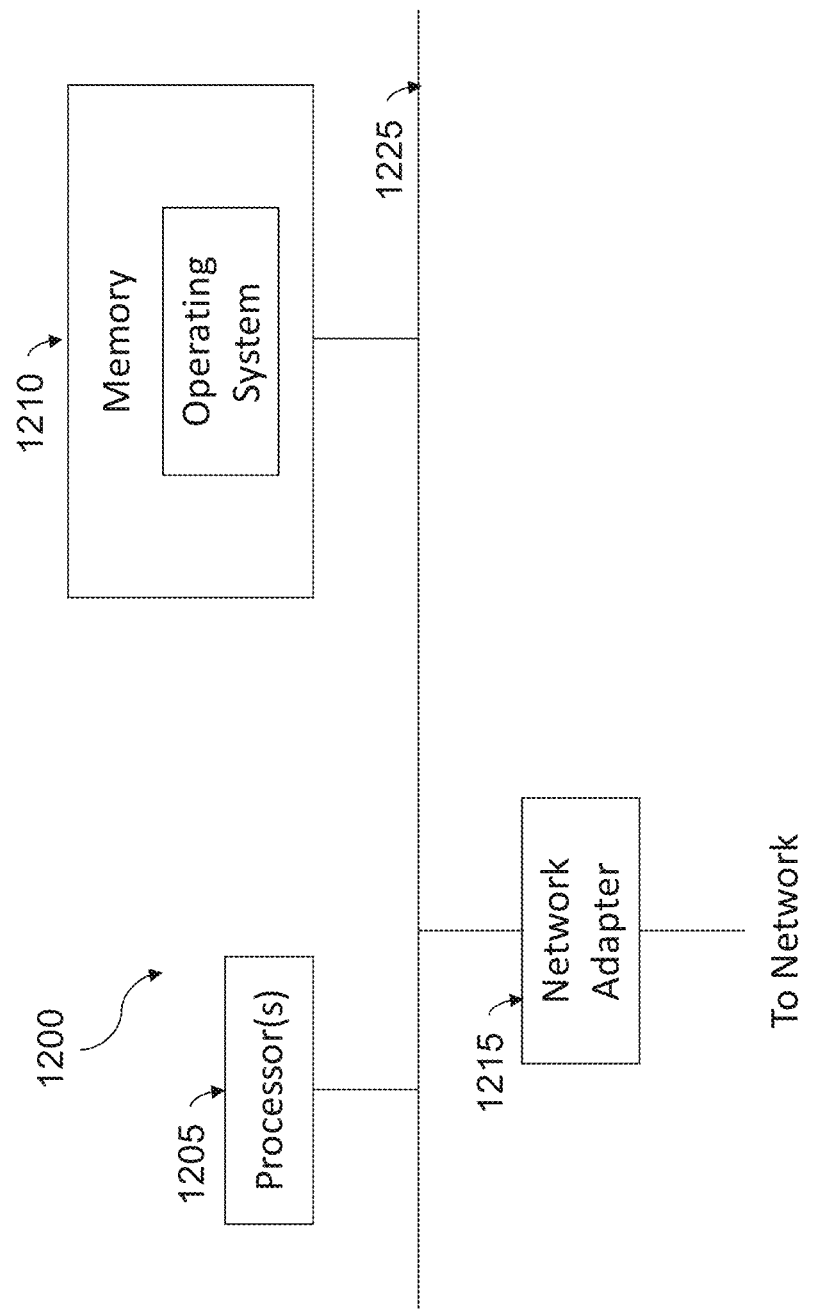
FIG. 12 is a block diagram illustrating an example of the architecture for a computer system or other electronic device that can be utilized to implement various portions of the presently disclosed technology.

FIG. 12 is a block diagram illustrating an example of the architecture for a computer system or other electronic device 1200 that can be utilized to implement or augment various methods and portions of the presently disclosed technology. In FIG. 12, the computer system 1200 includes one or more processors 1205 and memory 1210 connected via an interconnect 1225. The interconnect 1225 may represent any one or more separate physical buses, point to point connections, or both, connected by appropriate bridges, adapters, or controllers. The interconnect 1225, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 674 bus, sometimes referred to as "Firewire."

The processor(s) 1205 may include central processing units (CPUs) to control the overall operation of, for example, the host computer. In certain embodiments, the processor(s) 1205 accomplish this by executing software or firmware stored in memory 1210. The processor(s) 1205 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 1210 can be or include the main memory of the computer system. The memory 1210 represents any suitable form of random access memory (RAM), read-only memory (ROM), flash memory, or the like, or a combination of such devices. In use, the memory 1210 may contain, among other things, a set of machine instructions which, when executed by processor 1205, causes the processor 1205 to perform operations to implement embodiments of the presently disclosed technology.

Also connected to the processor(s) 1205 through the interconnect 1225 is a (optional) network adapter 1215. The network adapter 1215 provides the computer system 1200 with the ability to communicate with remote devices, such as the storage clients, and/or other storage servers, and may be, for example, an Ethernet adapter or Fiber Channel adapter.

Some exemplary embodiments of the presently disclosed technology include:
1) Systems, devices and methods including a hardware architecture of a binary neural network accelerator described in FIGS. 3A-3D and profiled in FIG. 4. Matrix sizes proposed in this example could change to adapt to the application without changing the concept and intention of the proposed architecture.
2) A proposed binary neural network as described in FIGS. 5A, 5B and 5C, where a micro-operation of a 128-bit wide with −1/+1 bit MAC unit is proposed. "−1" is represented by logic "0" and "+1" is represented by logic "1". Multiplication is therefore implemented using XNOR gate while polling is implemented using half-adder (HA) as illustrated in FIG. 5B. Critical path includes 13 full-adder (FA). Total computing elements include 120 FA, 127 HA and 128 XNOR. As illustrated, partial sums are even, saving a bit along the way through the adders.
3) An alternate implementation for computing elements of a binary neural network is proposed using pop-counting as opposed to the method of XNOR implementation proposed in Example 2. The proposed alternative architecture uses a 3/2 reduction tree as illustrated in FIG. 6. Critical path includes 9 full-adder. Total computing elements include 121 FA, 7 HA and 128 XNOR.
4) Proposed convolutional (CONV) layer for binary neural network in which we apply f filters of size m×n×128 to mm×nn×128 input activation and add the result with partial sums of the same segment (as illustrated in FIG. 7).

5) Proposed fully connected (FC) layer for binary neural network in which the operation is similar to Example 4, but apply f filters of size 1×1×128 to 1×1×128 input activation and add the result with partial sums of the same segment (as illustrated in FIG. 8).

6) Proposed memory partition of a binary neural network in which tightly coupled memory (TCM) is partitioned in four segments for f filters weights of each mm×nn×128 ($TCM_F$), input activation of size mm×nn×128 ($TCM_I$), partial sums of the mm×nn×f ($TCM_P$) and new activation output mm×nn×($TCM_O$). (as illustrated in FIG. 9).

7) Binary neural network with a set of instructions to optimize data movement between system memory and its tightly coupled memories (TCM) described in Example 6 including but not limited to: "LD.F fff kk" to load binary neural network filter weights from system memory to $TCM_F$, "LD.I M N K mm nn k" to load activations from system memory to $TCM_I$. "LD.PI M N K mm nn kk f" to load partial sums from system memory to $TCM_P$, "ST.PO M N K mm nn kk f" to store partial sums from $TCM_P$ to system memory, "ST.O M N K mm nn kk f" to store activations from $TCM_O$ to system memory.

8) Binary neural network with a set of instructions to implement neural network functions to optimize power and performance including but not limited to "CONV m n mm nn kk f ff" to apply convolution filtering function and "ACTV mm nn kk f" to apply activation function.

9) A pair of always ON neural network and main neural network working together on the same input. The always ON neural network is designed to be low power by reducing resolution and/or features. The main neural network is designed to be fully featured and generally shut down unless when needed. The always ON neural network processes the input data continuously to wake up the main neural network when the presence of features that need to be classified is detected. This will result in major power reduction as the main neural network is generally off and waken up only when required while the much lower power always ON neural network is working continuously (as illustrated in FIG. 11). Various implementations of always-ON and main neural networks could be used providing that the always-ON neural network is lower power than the main neural network without deviating from the main idea in this claim. As an example the always ON neural network could be a binary neural network while the main neural network could be a high resolution (multiple bits) neural network. The proposed concept could be applied but not limited to various applications such as voice keyword detection, natural language processing, image detection and anomaly detection for biological signals.

Example embodiments of the disclosed technology may be described using a clause-based description as enumerated below:

1. A logic circuit for computing a dot product in a binary neural network, the logic circuit comprising a first set of exclusive nor (XNOR) gates, each XNOR gate configured to receive one bit of a first vector of length N bits and one bit of a second vector of length N bits, to generate a product vector of length N bits at the output of the first set of XNOR gates, a first buffer and a second buffer each having a length N/2 bits to store the product vector in two portions, each of the first and the second buffers coupled to inputs of a second set of XNOR gates and to inputs of a first set of NOR gates, a third buffer and a fourth buffer each having a length N/2 bits, wherein the third buffer is configured to store output results of the first set of NOR gates, and the fourth buffer is configured to store output results of the second set of XNOR gates, and a plurality of adders having inputs that are coupled to the third and the fourth buffers and configured to add binary values stored in the third and the fourth buffers to generate the dot product of the first and second bit vectors.

2. The logic circuit of clause 1, wherein the plurality of adders are arranged in a tree structure having multiple levels, each level having a plurality of logic gates, wherein the binary values stored in the third and the fourth buffers are input to a first level of the tree structure, and outputs of the first level are connected to inputs of a second level of the tree structure.

3. The logic circuit of clause 1, wherein the plurality of adders comprises N/4 2-bit adders and N/8 3-bit adders.

4. The logic circuit of clause 3, wherein the plurality of adders further comprises N/16 4-bit adders and N/32 5-bit adders.

5. The logic circuit of clause 4, wherein the plurality of adders further comprises N/64 6-bit adders and N/128 7-bit adders.

6. A circuit for implementing a binary neural network, comprising a plurality of convolutional layers configured to implement at least a dot product of two-bit vectors, each vector having length N, based on a logic circuit, a plurality of pooling layers, and a plurality of fully connected layers, wherein a first layer of the plurality of convolutional layers is configured to receive an input signal, wherein a last layer of the plurality of fully connected layers is configured to provide a recognition value for the input signal in each of a plurality of classes, and wherein the logic circuit comprises a first set of logic gates configured to compute a bit-wise exclusive nor (XNOR) operation on the two bit vectors, a second set of logic gates configured to perform at least two distinct binary operations on a folded output of the bit-wise XNOR operation, and a third set of logic gates configured to add results of the at least two distinct binary operations.

7. The circuit of clause 6, wherein the input signal comprises an image, a temperature measurement, a humidity measurement, an electrocardiogram (EKG) reading, a heart rate or a hydration measurement.

8. The circuit of clause 6, wherein a first number of filters in the first layer of the plurality of convolutional layers is different from a second number of filters in a subsequent of layer of the plurality of convolutional layers.

9. The circuit of clause 6, further comprising one or more tightly coupled memory units that are partitioned into four segments, wherein at least one of the four segments of the one or more tightly coupled memory units stores filter weights associated with the plurality of convolutional layers.

10. The circuit of clause 7, wherein the circuit is controlled using an instruction set comprising at least one instruction that moves data between a system memory and the one or more tightly coupled memory units.

11. The circuit of clause 6, wherein the at least two distinct binary operations comprise a bit-wise XNOR operation and a bit-wise NOR operation.

12. The circuit of clause 6, wherein the third set of logic gates comprises a plurality of adders that are arranged in a tree structure having multiple levels.

13. A logic circuit for computing a dot product in a binary neural network, the logic circuit comprising a first set of logic gates configured to receive two bit vectors and compute a first bit-wise exclusive nor (XNOR) operation on the two bit vectors, a second set of logic gates configured to perform a second bit-wise XNOR operation and a bit-wise NOR operation on a folded output of the first bit-wise XNOR operation, and a third set of logic gates configured to add results of the second bit-wise XNOR operation and the bit-wise NOR operation.

14. A neural network system for signal classification, comprising a first neural network comprising a first input to receive an input signal, a second input to receive a wakeup signal, a first processor to perform, upon receiving the wakeup signal, a first classification of the input signal to produce a first classification result, and an output to provide the first classification result, and a second neural network comprising an input to receive the input signal, a second processor to continuously perform a second classification of the input signal to produce a second classification result, and an output coupled to the second input of the first neural network to provide the wake-up signal based on the second classification result, wherein the first neural network is configured to operate intermittently to remain in an off mode of operation and to only switch to an on mode of operation upon receiving the wake-up signal from the second neural network, the second neural network is configured to continually process the input signal in an always-on mode of operation and to generate the wake-up signal upon a determination of the second classification result.

15. The neural network system of clause 14, wherein the first classification result is more accurate than the second classification result.

16. The neural network system of clause 14, wherein the second neural network is a binary neural network.

17. The neural network system of clause 16, wherein the binary neural network comprises a logic circuit for computing a dot product in a binary neural network, the logic circuit comprising a first set of logic gates configured to receive two bit vectors and compute a first bit-wise exclusive nor (XNOR) operation on the two bit vectors, a second set of logic gates configured to perform a second bit-wise XNOR operation and a bit-wise NOR operation on a folded output of the first bit-wise XNOR operation, and a third set of logic gates configured to add results of the second bit-wise XNOR operation and the bit-wise NOR operation.

18. The neural network architecture of clause 14, wherein the first neural network is a real-valued convolutional neural network.

19. The neural network architecture of clause 14, wherein the first neural network is a binary neural network, and wherein the first classification operates on more classes than the second classification.

20. The neural network architecture of clause 14, wherein the second neural network is configured to: (a) process a limited subset of tasks compared to the first neural network, or (b) process the same set of tasks as the first neural network but at a lower precision or accuracy compare to the first neural network.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, e.g., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). In an example, the binary neural network may be implemented on an ASIC or FPGA.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A logic circuit for computing a dot product in a binary neural network, the logic circuit comprising:
    a first set of exclusive nor (XNOR) gates, each XNOR gate configured to receive one bit of a first vector of length N bits and one bit of a second vector of length N bits, to generate a product vector of length N bits at the output of the first set of XNOR gates;
    a first buffer and a second buffer each having a length N/2 bits to store the product vector in two portions, each of the first and the second buffers coupled to inputs of a second set of XNOR gates and to inputs of a first set of NOR gates;
    a third buffer and a fourth buffer each having a length N/2 bits, wherein the third buffer is configured to store output results of the first set of NOR gates, and the fourth buffer is configured to store output results of the second set of XNOR gates; and
    a plurality of adders having inputs that are coupled to the third and the fourth buffers and configured to add binary values stored in the third and the fourth buffers to generate the dot product of the first and second bit vectors.

2. The logic circuit of claim 1, wherein the plurality of adders are arranged in a tree structure having multiple levels, each level having a plurality of logic gates, wherein the binary values stored in the third and the fourth buffers are input to a first level of the tree structure, and outputs of the first level are connected to inputs of a second level of the tree structure.

3. The logic circuit of claim 1, wherein the plurality of adders comprises N/4 2-bit adders and N/8 3-bit adders.

4. The logic circuit of claim 3, wherein the plurality of adders further comprises N/16 4-bit adders and N/32 5-bit adders.

5. The logic circuit of claim 4, wherein the plurality of adders further comprises N/64 6-bit adders and N/128 7-bit adders.

6. A circuit for implementing a binary neural network, comprising:
    a plurality of convolutional layers configured to implement at least a dot product of two-bit vectors, each vector having length N, based on a logic circuit;
    a plurality of pooling layers; and
    a plurality of fully connected layers,
    wherein a first layer of the plurality of convolutional layers is configured to receive an input signal, wherein a last layer of the plurality of fully connected layers is configured to provide a recognition value for the input signal in each of a plurality of classes, and wherein the logic circuit comprises:
        a first set of logic gates configured to compute a bit-wise exclusive nor (XNOR) operation on the two bit vectors,
        a second set of logic gates configured to perform at least two distinct binary operations on a folded output of the bit-wise XNOR operation, and
        a third set of logic gates configured to add results of the at least two distinct binary operations.

7. The circuit of claim 6, wherein the input signal comprises an image, a temperature measurement, a humidity measurement, an electrocardiogram (EKG) reading, a heart rate or a hydration measurement.

8. The circuit of claim 7, wherein the circuit is controlled using an instruction set comprising at least one instruction that moves data between a system memory and the one or more tightly coupled memory units.

9. The circuit of claim 6, wherein a first number of filters in the first layer of the plurality of convolutional layers is different from a second number of filters in a subsequent of layer of the plurality of convolutional layers.

10. The circuit of claim 6, further comprising:
    one or more tightly coupled memory units that are partitioned into four segments,
    wherein at least one of the four segments of the one or more tightly coupled memory units stores filter weights associated with the plurality of convolutional layers.

11. The circuit of claim 6, wherein the at least two distinct binary operations comprise a bit-wise XNOR operation and a bit-wise NOR operation.

12. The circuit of claim 6, wherein the third set of logic gates comprises a plurality of adders that are arranged in a tree structure having multiple levels.

13. A logic circuit for computing a dot product in a binary neural network, the logic circuit comprising:
    a first set of logic gates configured to receive two bit vectors and compute a first bit-wise exclusive nor (XNOR) operation on the two bit vectors;
    a second set of logic gates configured to perform a second bit-wise XNOR operation and a bit-wise NOR operation on a folded output of the first bit-wise XNOR operation; and
    a third set of logic gates configured to add results of the second bit-wise XNOR operation and the bit-wise NOR operation.

14. A neural network system for signal classification, comprising:
- a first neural network comprising:
    - a first input to receive an input signal,
    - a second input to receive a wakeup signal,
    - a first processor to perform, upon receiving the wakeup signal, a first classification of the input signal to produce a first classification result, and
    - an output to provide the first classification result; and
- a second neural network comprising:
    - an input to receive the input signal,
    - a second processor to continuously perform a second classification of the input signal to produce a second classification result, and
    - an output coupled to the second input of the first neural network to provide the wake-up signal based on the second classification result,
- wherein:
    - the first neural network is configured to operate intermittently to remain in an off mode of operation and to only switch to an on mode of operation upon receiving the wake-up signal from the second neural network,
    - the second neural network is configured to continually process the input signal in an always-on mode of operation and to generate the wake-up signal upon a determination of the second classification result.

15. The neural network system of claim 14, wherein the first classification result is more accurate than the second classification result.

16. The neural network system of claim 14, wherein the second neural network is a binary neural network.

17. The neural network system of claim 16, wherein the binary neural network comprises a logic circuit for computing a dot product in a binary neural network, the logic circuit comprising:
- a first set of logic gates configured to receive two bit vectors and compute a first bit-wise exclusive nor (XNOR) operation on the two bit vectors;
- a second set of logic gates configured to perform a second bit-wise XNOR operation and a bit-wise NOR operation on a folded output of the first bit-wise XNOR operation; and
- a third set of logic gates configured to add results of the second bit-wise XNOR operation and the bit-wise NOR operation.

18. The neural network architecture of claim 14, wherein the first neural network is a real-valued convolutional neural network.

19. The neural network architecture of claim 14, wherein the first neural network is a binary neural network, and wherein the first classification operates on more classes than the second classification.

20. The neural network architecture of claim 14, wherein the second neural network is configured to: (a) process a limited subset of tasks compared to the first neural network, or (b) process the same set of tasks as the first neural network but at a lower precision or accuracy compare to the first neural network.

* * * * *